United States Patent [19]

Plaquin et al.

[11] Patent Number: 4,828,295
[45] Date of Patent: * May 9, 1989

[54] STEEL TUBE THREADED JOINT HAVING AN IMPERVIOUS DEVICE AT THE LEVEL OF THE THREADING

[75] Inventors: Bernard Plaquin; Paul Bounie, both of Aulnoye Aymeries, France

[73] Assignee: Vallourec, Paris, France

[*] Notice: The portion of the term of this patent subsequent to May 9, 2006 has been disclaimed.

[21] Appl. No.: 939,297

[22] Filed: Dec. 5, 1986

Related U.S. Application Data

[63] Continuation of Ser. No. 785,765, Oct. 9, 1985, abandoned.

[30] Foreign Application Priority Data

Oct. 10, 1984 [FR] France ............... 84 15551

[51] Int. Cl.⁴ ............... F16L 15/04; E21B 17/042
[52] U.S. Cl. ............... 285/334; 285/332.3; 285/355; 264/162; 264/262
[58] Field of Search ............... 785/334, 55, 94, 333, 785/355, 390; 264/139, 269

[56] References Cited

U.S. PATENT DOCUMENTS

| | | |
|---|---|---|
| 1,474,375 | 11/1923 | Moore . |
| 1,946,619 | 2/1934 | Furman et al. ............... 264/262 |
| 2,086,133 | 7/1937 | Kennedy ............... 285/297 |
| 2,177,100 | 10/1939 | Frame ............... 285/334 |
| 2,380,690 | 7/1945 | Graham . |
| 2,631,871 | 3/1953 | Stone ............... 285/106 |
| 2,671,949 | 3/1954 | Welton ............... 285/334 |
| 2,756,479 | 7/1956 | Garneau ............... 285/55 |
| 2,760,585 | 8/1956 | Bergeron ............... 285/94 |
| 3,047,316 | 7/1962 | Wehring et al. ............... 285/334 |
| 3,101,207 | 8/1963 | Pavel ............... 285/55 X |
| 3,339,003 | 8/1967 | Cessna ............... 29/458 |
| 3,391,101 | 7/1968 | Kelly ............... 285/294 |
| 3,850,461 | 11/1974 | Fujioka et al. . |
| 4,153,656 | 5/1979 | Bunyan ............... 264/269 |
| 4,226,444 | 10/1980 | Bunyan . |
| 4,473,245 | 9/1984 | Raylins et al. ............... 285/334 |
| 4,508,326 | 4/1985 | Andre ............... 269/22 |
| 4,629,223 | 12/1986 | Dearden et al. ............... 285/334 |
| 4,630,849 | 12/1986 | Fukui et al. ............... 285/333 |

FOREIGN PATENT DOCUMENTS

| | | |
|---|---|---|
| 3243450 | 11/1982 | Fed. Rep. of Germany . |
| 2201741 | 4/1974 | France . |
| 2524962 | 4/1983 | France . |
| 121226 | 10/1978 | Japan . |
| 557499 | 12/1974 | Switzerland . |
| 2064041 | 6/1981 | United Kingdom ............... 285/334 |

Primary Examiner—Thomas F. Callaghan
Assistant Examiner—Anthony Knight
Attorney, Agent, or Firm—Arnold, White & Durkee

[57] ABSTRACT

The invention concerns a steel tube threaded joint particularly useful in the petroleum industry of the type in which the male element (3) and female element (1) are combined by threading (2, 4) wherein a portion of the surface of each thread is forcefully applied to the status of screwing to the thread of the other element. A first element (1) of the joint has a composite structure and has on at least a certain length of its thread a lining of synthetic material whose volume and shape correspond exactly to the volume and shape of the existing clearance of the screwing status between the metal part and composite element (1) and the second element (3) having dimensions at the limit of the machining tolerances which allow the greatest possible clearance in the assembled state of the joint.

2 Claims, 5 Drawing Sheets

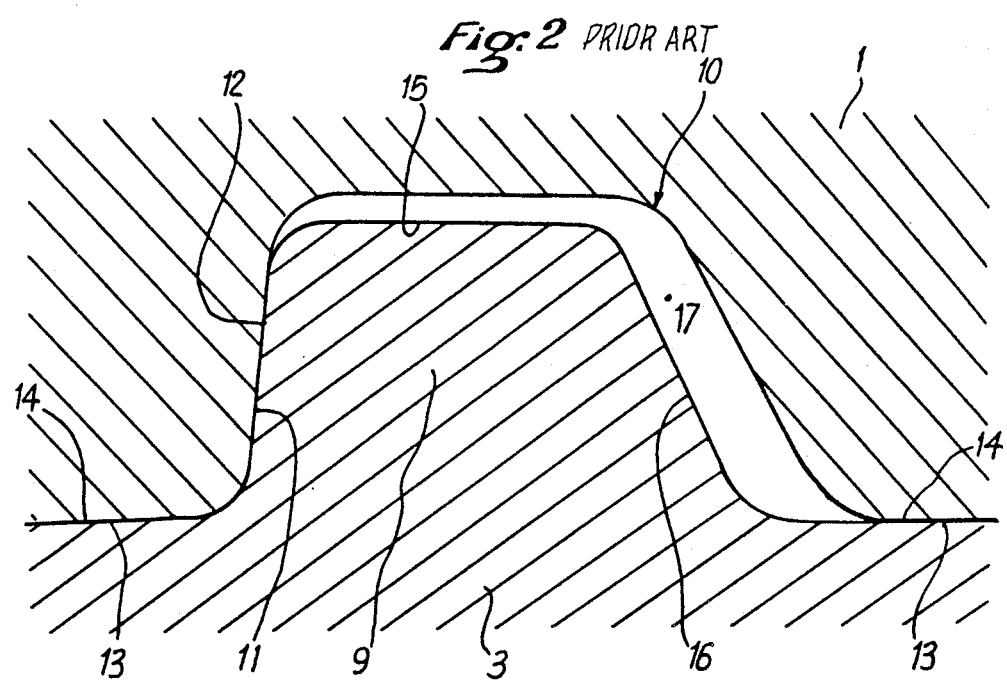
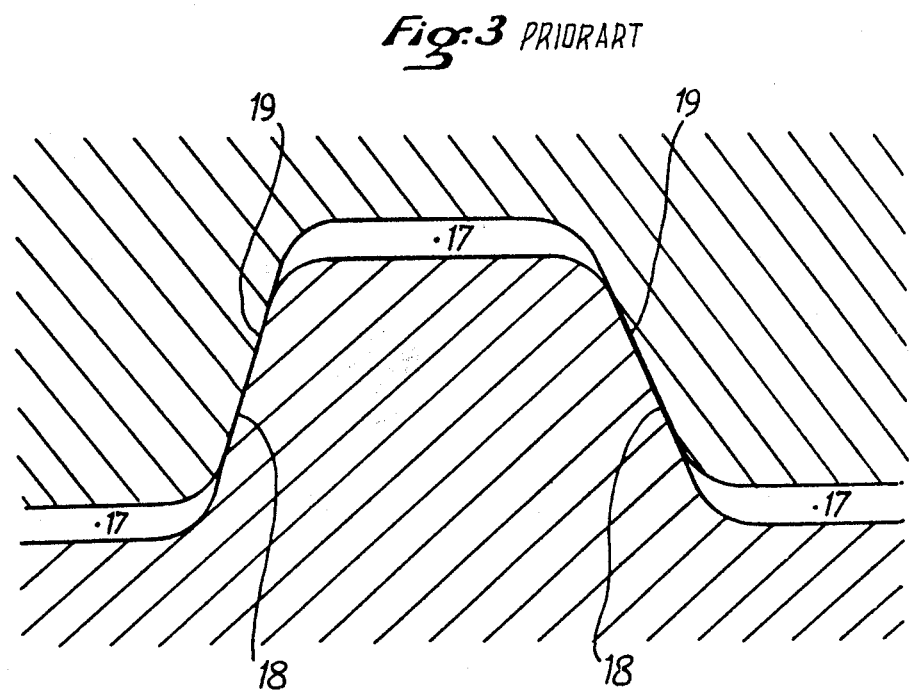

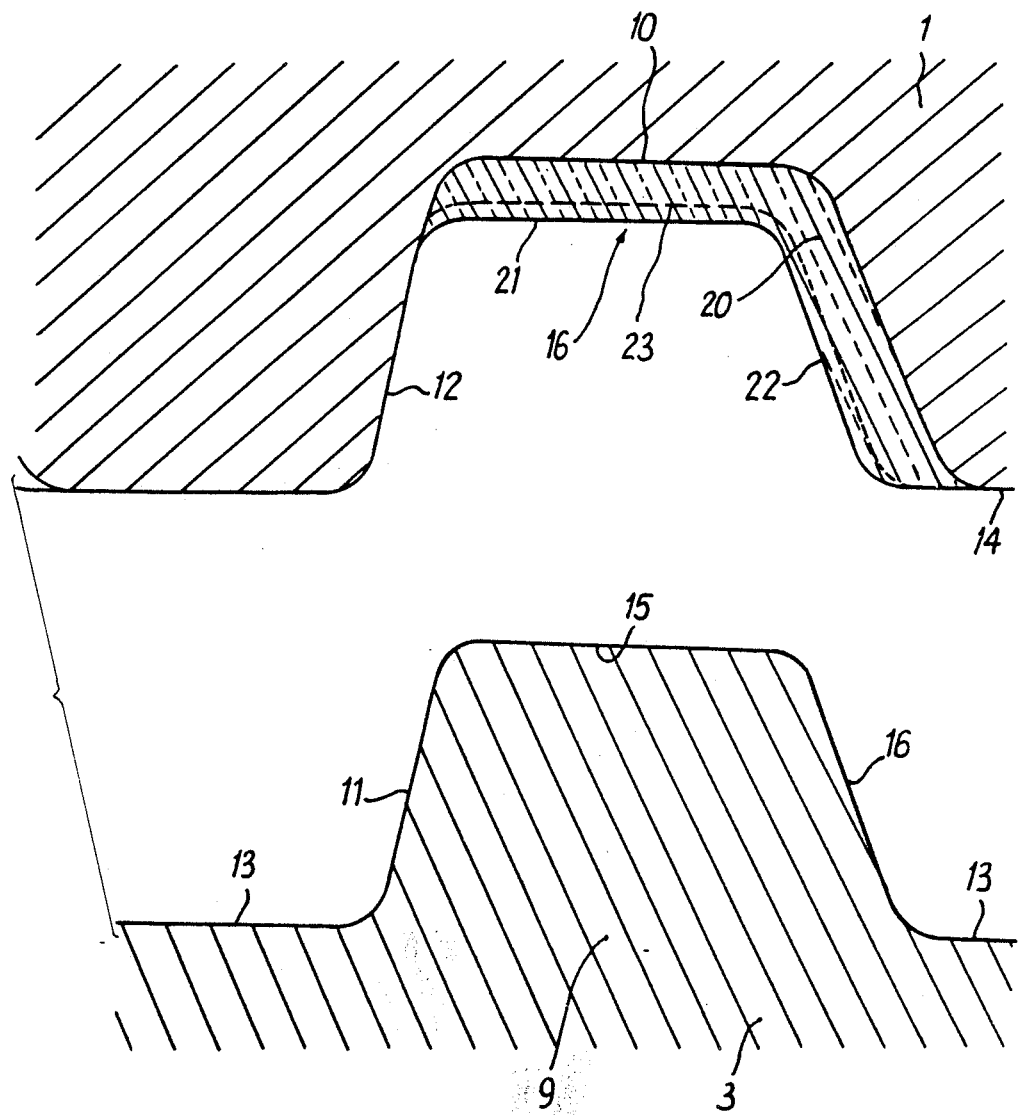

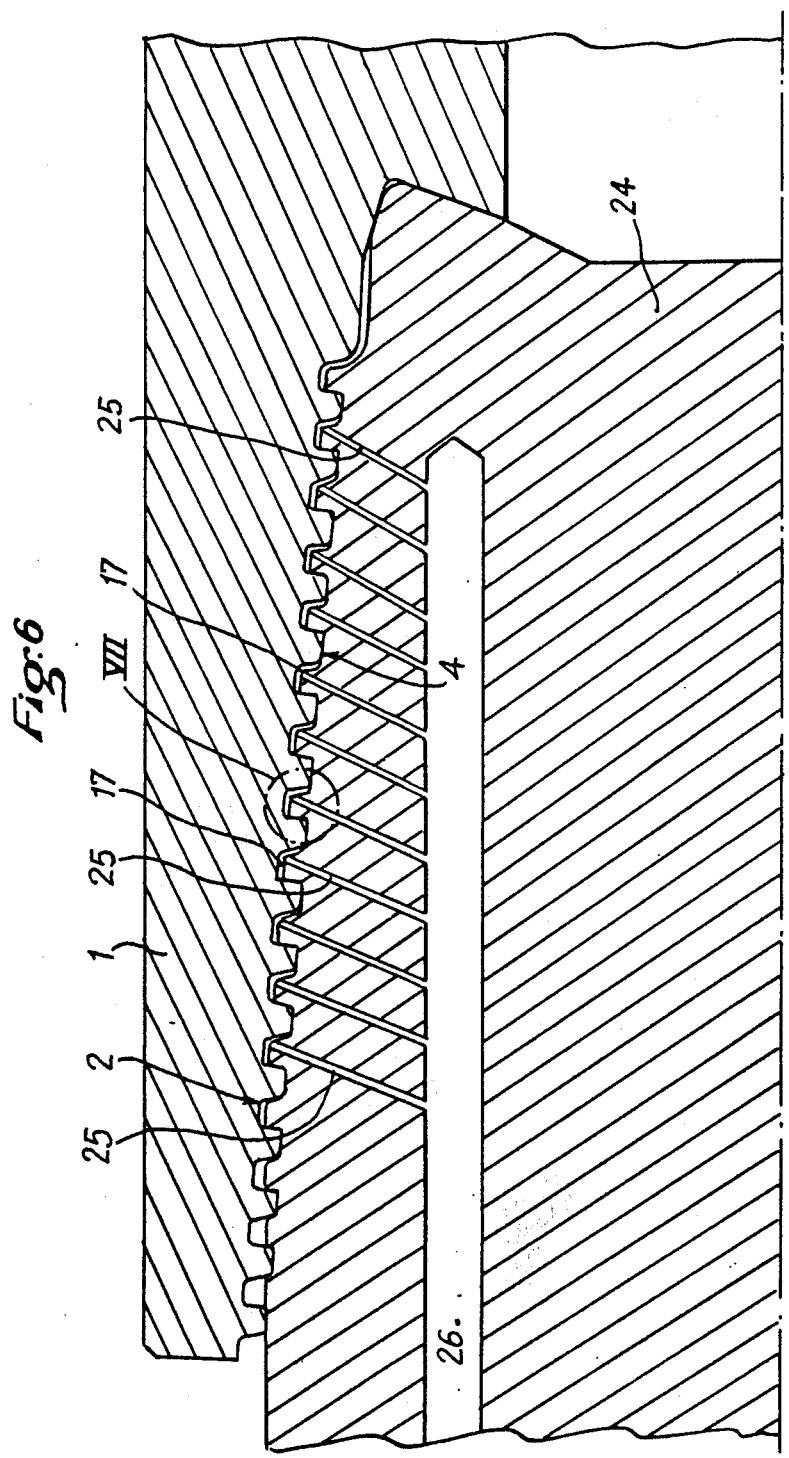

STEEL TUBE THREADED JOINT HAVING AN IMPERVIOUS DEVICE AT THE LEVEL OF THE THREADING

This is a continuation of co-pending application Ser. No. 787,765 filed on Oct. 8, 1985, now abandoned.

BACKGROUND OF THE INVENTION

The present invention concerns a threaded joint for a steel tube, usable in particular for the petroleum industry, which contains a sealing device at the level of the threadings.

FIELD OF THE INVENTION

It is known that tube joints used in the petroleum industry must present a certain number of characteristics that are difficult to reconcile, consisting in particular of the fact that the joint, while being easy to machine and not very sensitive to damage, permits assurance of perfect tightness with respect to very high pressures that are exerted either inside or outside of this joint, even under the hypothesis where the joint is subjected to bending and substantial tensile stresses or axial compressions.

It is also necessary that the joint elements be interchangeable without this adversely affecting the quality of the seal that is obtained during rescrewing of the joint with other elements.

The threaded joints now used in the petroleum industry first comprise male and female threadings that are most often conical (but which can also be cylindrical) and which ensure mechanical maintenance of the two elements of the tube in one another, supporting in particular the axial stresses exerted on the joint.

In most cases the known joints also comprise so-called screw stops whose purpose is to immobilize the male element relative to the female element as soon as the prescribed screwing torque is reached.

In this case it is also not generally possible to unscrew the joint and rescrew it by interchanging elements while preserving the required tightness.

SUMMARY OF THE INVENTION

The present invention seeks to impart to joints for a steel tube intended for the petroleum industry complete tightness at the level of the threadings, while enjoying the advantage of imparting to the joints a more monolithic character by suppressing the different clearances that are necessary in the devices known to date.

In effect, it is known that, in order to fulfill their primarily function, which is to mechanically unite the two elements of the tube, each thread of the male element must be applied to the corresponding thread of the female element necessarily in an axial direction and most often in a radial direction as well.

This means that one can break down the contour of the threads of a joint in the clamped condition into surfaces that are strongly applied to each other during screwing of the joint and surfaces of the male element and female element that face each other at a certain distance from one another and between which the clearance existing in the threading is located.

It follows from the existence of this part of the contour where the surfaces of the male and female elements are separated from one another that to date it has not been possible to achieve satisfactory tightness in practice at the level of the threadings of this type of joint.

In this case it is also not generally possible to unscrew the joint and rescrew it by interchanging elements while preserving the required tightness.

In effect, the existence of this clearance between the corresponding surfaces of the male threading and female threading first metallic element, which during clamping would leave a clearance with the second element, is lined with a synthetic material so that with the maximum tolerances of the entirely metallic second element there is no longer any clearance during screwing of the two elements according to the invention.

One understands that in this manner the mass of the synthetic material so applied to the first element does not have to be molded during screwing in order to be adapted to the shape of the threading of the second entirely metallic element, as was previously known, but that it is simply subject to a slight compression that results from the machining tolerances.

The coating of synthetic material that is placed on the second element according to the invention can be obtained in different ways.

According to a first process according to the invention one screws on or into the first element that must receive the lining a mandrel containing a threading whose dimensions correspond exactly to the tolerance limits for the second metallic element that must be screwed on or into the first; and by means of a number of channels arranged in the mandrel one injects between the two threadings the synthetic material that by adhering to the first element imparts to it the composite character that permits tightness to be achieved in the threading according to the invention. According to another process one obtains the composite element according to the invention by fixing on the metal part of this first composite element that one wishes to make a mass of synthetic material in which one causes polymerization, whereupon one machines this synthetic material so that it only remains in the zones where the metal surfaces of the threading of the second metallic element must not be applied against the corresponding metal surfaces of the threading of the first composite element, and with a periphery that permits occupation of the entire free space remaining between the male threading and female threading during clamping of the joint.

According to the invention it is advantageous to use as synthetic material urethane elastomers such as Polathane XPE or RIM 160 with microcellular structure, polycarbonates, polyolefins, polyamides.

BRIEF DESCRIPTION OF THE DRAWINGS

To better comprehend the invention several versions without limiting characteristics will not be described as depicted on the accompanying drawing in which:

FIG. 2 is a cross section on the larger scale representing a first version of the threads of a conventional joint, FIG. 3 represents a cross section of a second version of threads of a conventional joint, FIG. 5 represents a cross section of a pair of male and female threads according to the invention, FIG. 6 represents a device that permits producing threads according to the invention.

DETAILED DESCRIPTION OF THE PREFERRED EMBODIMENT

Figure 1:
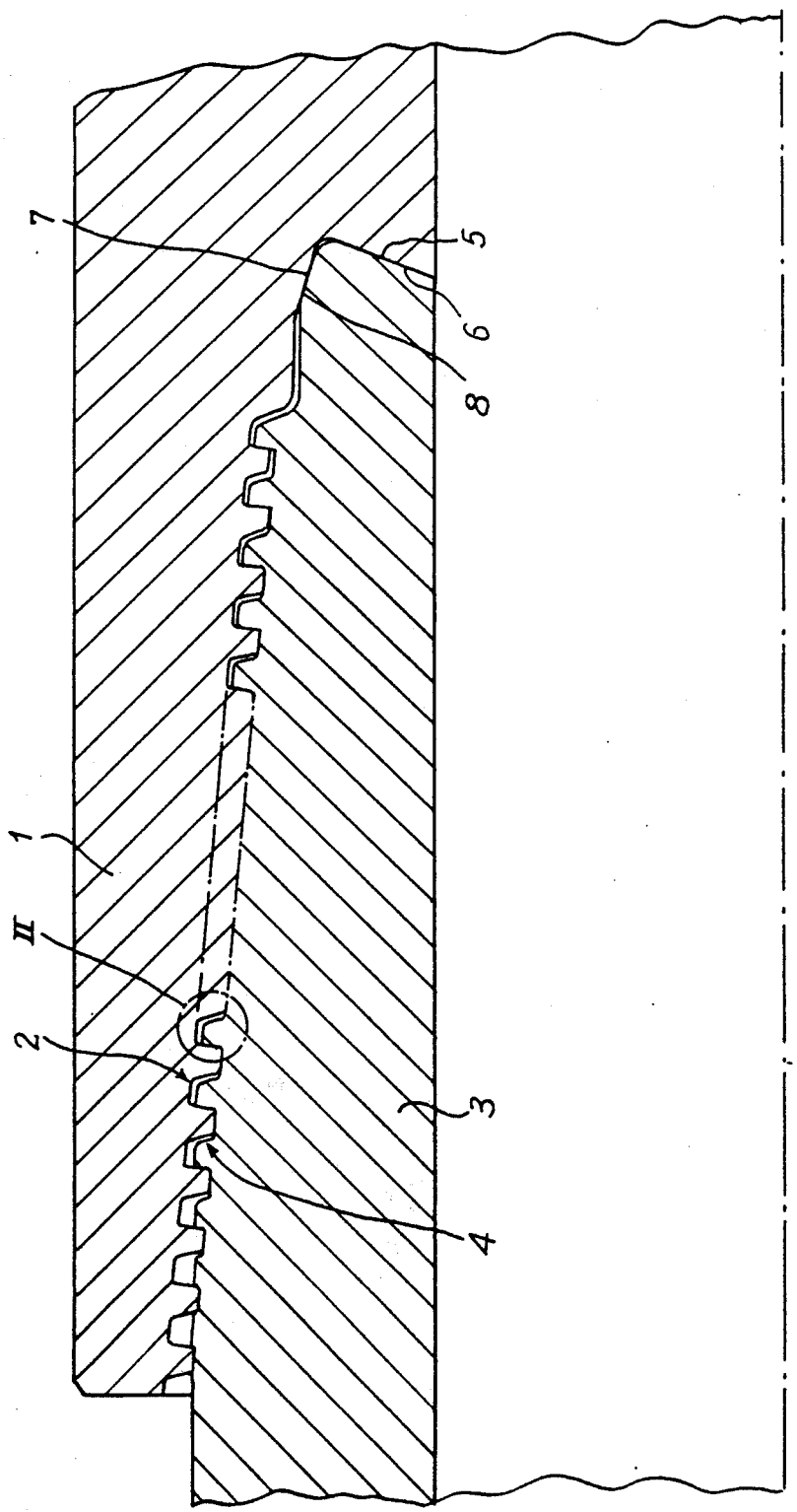
FIG. 1 represents a cross section of a conventional joint for the petroleum industry.

In FIG. 1 a joint of a type commonly used in the petroleum industry is shown in cross section.

This joint comprises a female element or sleeve 1 which contains an internal conical threading 2 in which the male element 3 is engaged by virtue of a corresponding external conical threading 4.

A stop 5 arranged inside the female element serves as a support on end 6 of the male element to limit screwing, whereas a pair of surfaces 7 and 8 arranged respectively on the female and male elements assure tightness of the joint.

FIG. 2 shows on a larger scale one element of the joint thread of FIG. 1.

We see in FIG. 2 how the thread 9 of male element 3 is engaged in a recess 10 of female element 1. Considering the existence of the screw stop 5, the side 11 of thread 9 is strongly applied axially against side 12 of recess 10.

Moreover, the bottom of thread 13 of male element 3 is strongly applied radially against the top of thread 14 of the female element because of the conicity of the threadings and the resulting reinforcement.

In the version shown it is the tops of the female threadings that rest against the recesses of the male threadings, but this could be opposite if during machining one makes the height of teeth 9 greater than that of recesses 10.

Under these conditions one sees that, if the complete periphery of one thread of the male element is considered, one finds that on the bottoms of thread 13 and the sides of thread 11 the female element is strongly applied against the male element which ensures tightness in this zone. On the other hand, at the level of top 15 and rear side 16 of thread 9 of the male element there is necessarily a clearance between the female element and the male element. This clearance shown at 17 in FIG. 2 means that until now it has not been possible to obtain satisfactory tightness at the level of the threadings.

One understands in effect that this clearance, which is shown in FIG. 2 at the level of one thread, continues helicoidally along the threading between the male element and the female element.

Another version of threadings is depicted in FIG. 3 in which the reinforcement produced during screwing of the truncated male threading in the truncated female threading is exerted on the lateral sides 18 and 19 of the threads, leaving free spaces 17 on the tops of both the male threadings and the female threadings.

Figure 4:
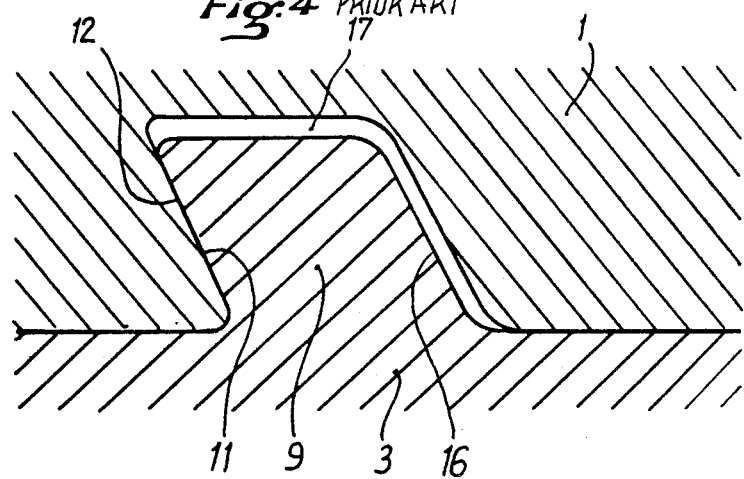
FIG. 4 represents a cross section of a third version of threads of a conventional joint.

FIG. 4 shows another version of threadings that differs from the version depicted in FIG. 2 by the fact that the support side 11 of the male element and the support side 12 of the female element form an angle inclined forward relative to the radial plane of the joint.

This type of threading also leaves a clearance 17 on the top of male thread 9 and on its rear side 16.

FIG. 6 shows how one can obtain perfect tightness at the level of the threadings by virtue of the invention.

In FIG. 6, we find the thread 9 of the male element, its support side 11, its top 15, its rear side 16 and its thread recesses 13.

In the version depicted the male element is an element of a conventional joint, whereas the female element 1 is a composite element made according to the invention to cooperate with the male element.

One finds on the female element 1 the recess of thread 10 with its support 12 and the tops of thread 14.

According to the invention the recess of thread 10 is coated with a lining of a synthetic material 20 that adheres to the metal part of female element 1 and whose bottom 21 and rear side 22 have a shape that corresponds to the profile in the screwed condition of the thread of the male element whose dimensions are at the lower limit of tolerance provided for machining of the threading of the male element.

It follows that when one screws onto the female element 1 a male element that is at the lower tolerance limit, no free space remains between the female element and the male element, considering the fact that contact with the male element is ensured either by metal part 12, 14 of the female element or by the circumference 21, 22 of the lining of synthetic material of the female element.

However, one understands that in almost all cases, during screwing, threading of the male element slightly compresses the synthetic lining 20 of the female element, reinforcing the tightness that is obtained.

The broken line 23 on the female element thus shows the circumference on the threading of the male element in the screwed condition of the joint.

Under these conditions one understands that the joint according to the invention ensures perfect tightness at the level of the threading, since the dimension of one thread of the male element varies along the helicoidal course of this thread within the manufacturing tolerances so that in at least one zone of this helicoidal course the top 15 and the rear side of the thread of the male element ensure sufficient compression of synthetic material 20 to ensure perfect tightness along the threading.

Under these conditions one also understands that according to the invention it is not necessary to make the synthetic lining 20 along the entire threading and that one can be content to make this lining at a given site.

However, it is nevertheless interesting to make this synthetic lining 20 along the entire threading so as to enhance the monolithic characteristics of the joint, especially in cases where the latter is achieved with one or more cylindrical threadings, which, as is known, permit lateral movements of the male element relative to the female element.

Figure 7:
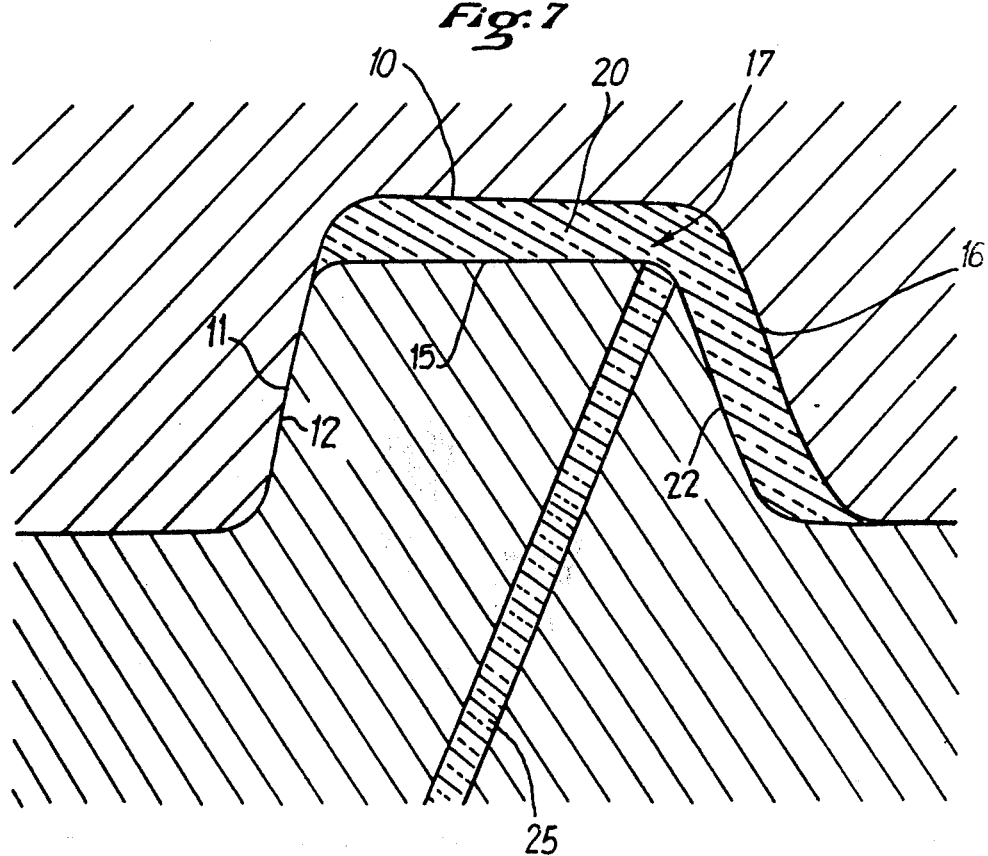
FIG. 7 is a view on a larger scale of part VII of FIG. 6.

FIGS. 6 and 7 show a device that permits manufacture of the composite female element depicted in FIG. 5.

One sees is FIG. 6 a cross section representing the female element 1 on which one applies the synthetic material 20 to obtain tightness according to the invention.

For this purpose one screws into the female element a mandrel 24 whose threading has been machined precisely to correspond exactly to the minimal dimensions of manufacturing tolerance of the male element that must be coupled with the female element.

The mandrel 24 is screwed into element 1 with a screwing torque sufficient to ensure contact of the sides and the bottoms and supporting tops of the male and female threadings involved.

The mandrel is provided with a number of channels 25 that lead into space 17 between the external threading of mandrel 24 and threading 2 of female element 1, this group of channels being combined into a main channel 26 that permits injection of a synthetic material under pressure into space 17.

FIG. 7 shows on a larger scale how channel 25 ends in space 17 between top 15 and non supporting rear side 22 of the thread of the male element and bottom 10 and non-supporting rear side 16 of the female element for injecting the synthetic material 20 which adheres to the female element and whose free surface corresponds exactly to the shape of the corresponding thread at the minimal dimensions compatible with machining tolerances.

In order for this synthetic material 20 not to adhere to the mandrel during mold release by unscrewing, it is sufficient to coat the surface of the latter with an antiadherent material.

According to the invention the synthetic material used is a urethane elastomer known as Polathane XPE.

In another version of the invention it is possible to inject the synthetic material so that it forms a complete lining and even coats the threading of the female element, by using a mandrel devoid of threading, and when the synthetic material 20 had hardened, by carrying out mechanical machining so as to leave only the synthetic material that corresponds to that shown in FIG. 7.

It is understood that the methods of manufacture described above do not represent a limiting characteristic and that they could undergo any desirable modifications without departing from the scope of the invention.

In particular, it is clear that, although in the described versions it is the female element that is composite according to the invention because it receives a layer of synthetic material, it is also possible to apply this lining of synthetic material to the male element (the female remaining conventional) by carrying out this application with a female mandrel.

Finally, it goes without saying that one could make two composite elements without departing from the scope of the invention although this solution is more complicated.

What is claimed is:

1. A joint for steel tubing usable in the petroleum industry comprising a male element with an external threading for being assembled by screwing with a female element with a corresponding internal threading wherein a first of said elements comprises a composite structure comprising a lining of synthetic material secured to said first element prior to make up on the part of its threading which does not come into contact with the threading of the second element when the joint is made up with its nominal torque, the volume and shape of said synthetic material lining corresponding to the volume and shape of the clearance that would exist in the made up condition between the steel part of the first element and the second element the dimensions of which are at the limit of the machining tolerances giving the greatest possible clearance between the threads and the made up conditions of the joint, said lining adhering only to said first element.

2. A joint according to claim 1, wherein the lining of synthetic material comprises a urethane elastomer with microcellular structure, a polycarbonate, a polyolefin or a polyamide.

* * * * *